(12) United States Patent
Chan

(10) Patent No.: US 7,245,707 B1
(45) Date of Patent: Jul. 17, 2007

(54) DATA NETWORK BASED TELEPHONE MESSAGING SYSTEM

(76) Inventor: Hark C. Chan, 861 Brent Dr., Cupertino, CA (US) 95014

(*) Notice: Subject to any disclaimer, the term of this patent is extended or adjusted under 35 U.S.C. 154(b) by 192 days.

(21) Appl. No.: 10/700,888

(22) Filed: Nov. 4, 2003

Related U.S. Application Data (63) Continuation-in-part of application No. 09/532,616, filed on Mar. 22, 2000, now abandoned.

(60) Provisional application No. 60/126,289, filed on Mar. 26, 1999.

(51) Int. Cl.
*H04M 1/64* (2006.01)

(52) U.S. Cl. .................. 379/88.17; 379/88.13; 370/229; 709/227

(58) Field of Classification Search ............ 379/88.13, 379/88.17; 370/229; 709/227
See application file for complete search history.

(56) References Cited

U.S. PATENT DOCUMENTS

| | | | |
|---|---|---|---|
| 5,623,538 A * | 4/1997 | Petty ..................... | 379/88.13 |
| 5,781,615 A | 7/1998 | Bales et al. .................. | 379/89 |
| 6,181,684 B1 | 1/2001 | Turcotte et al. ............. | 370/332 |
| 6,216,006 B1 | 4/2001 | Scholefield et al. ........ | 455/450 |
| 6,285,745 B1 | 9/2001 | Bartholomew et al. .. | 379/88.17 |
| 6,396,908 B1 * | 5/2002 | O'Donovan et al. ...... | 379/88.18 |
| 6,412,006 B2 * | 6/2002 | Naudus ...................... | 709/227 |
| 2001/0012334 A1 | 8/2001 | Lester et al. ............... | 379/67.1 |
| 2003/0133406 A1 * | 7/2003 | Fawaz et al. ............... | 370/229 |

\* cited by examiner

*Primary Examiner*—Gerald Gauthier (57) ABSTRACT

A sending device exchanges handshake signals with a recording device prior to the delivery of voice messages. The sending and recording device are remotely connected using a data network. In one embodiment of the present invention, the data network provides different levels of quality of services (QOS). The voice message can be sent using a low QOS level that permits long delays between voice-based data packets. On the other hand, the handshaking negotiation (e.g., the status request and acknowledgment packets) is carried out using a higher QOS level that permits shorter delays. By knowing the status of the recording device before recording, a user will not waste time to record the voice message.

17 Claims, 5 Drawing Sheets

DATA NETWORK BASED TELEPHONE MESSAGING SYSTEM

CROSS-REFERENCE TO RELATED PROVISIONAL APPLICATION

This application is a continuation in part of U.S. patent application Ser. No. 09/532,616, filed Mar. 22, 2000 now abandoned, which claims the benefit of U.S. Provisional Application Ser. No. 60/126,289 filed Mar. 26, 1999. These patent applications are incorporated herein by reference.

FIELD OF THE INVENTION

The present invention relates to telephone systems, and more specifically to a data network based telephone system that can dispatch, receive, and store messages.

Answering machine is probably the most popular peripheral connected to a telephone. It answers telephone calls automatically and allows callers to leave messages if the machine owner is not able to answer the calls. The answering machine is especially useful for business because it facilitates delivery of information. A few technology companies realized that they can design systems containing more features to further improve the utility of this kind of machines. The resulting product is a system called "voice mail". A voice mail system can serve many telephones in a premise, and provides centralized management of voice messages to all these telephones. It also allows users more options in controlling their mails (e.g., varying the duration of mail retention, multiple greeting messages, message broadcasting, etc.). Some voice mail systems even allow callers to edit their messages before hanging up. As of today, almost all large and medium sized companies have implemented some form of voice mail systems.

Telephone calls are carried by telephone networks. The basic structure of a conventional telephone network has been the same for several decades. Basically, a communication line (called a subscriber loop) is used to connecting a telephone (or voice mail system) to a conventional central office. If the incoming signal is analog signal, the central office converts the analog voice electrical signal on the subscriber loop into digital data. The digital data is carried by long distant trunk lines to the central office of the recipient telephone (or voice mail system). If the recipient telephone accepts analog signal, this recipient central office reconverts the digital data into analog signal. As a result, the users of the telephones can communicate verbally.

When a telephone call is made, a dedicated connection (called switched circuit) is created between a calling telephone and a called telephone. This connection is maintained even during silent periods when no one is talking on the two telephones. As a result, this is not an efficient way of using the connection. Recently, there are suggestions that telephone voice signals can be carried using networks designed for carrying regular digital data instead of digitized voice. Under this suggestion, the voice signals are digitized in the telephone (instead of the central office), and the digitized voice data is encapsulated into data packets. These data packets are delivered to the data network. The data network groups together the data packets generated by many telephones and then transports these packets together with other types of data packets. There is no need to set up a dedicated connection between the calling and the called telephones. Further, bandwidth can be assigned on an on-demand basis. As a result, this is a more efficient telephone system. The technology for transporting voice using a regular data network instead of a dedicated connection has been developed, and is commonly called voice-over-data-network. If the network is the Internet, it is called voice-over-IP.

However, there are problems in using regular data network to carry voice data. In order for voice to sound natural in a telephone system, the voice data packets must travel from one telephone to another within a very short time (e.g., less than 100 milliseconds). However, the size of a regular data file could be very large in some cases (e.g., more than a thousand times the size of a voice packet). While this data file is being transported through the network, it could block out the voice data packets for several seconds. Thus, in many cases, it is necessary to give voice data packets higher priority in the network so that they can move rapidly even in the present of a big data file. Consequently, a special network that can assign priority to different types of data packets needs to be used. However, this kind of network is expensive. Thus, it is desirable to provide more services to telephone users that use this kind of network.

U.S. Pat. No. 5,623,538 issued to Petty and U.S. Pat. No. 5,781,615 issued to Bales et al. disclose message storage devices, and are incorporated herein by reference.

SUMMARY OF THE INVENTION

There are some situations in which it is more convenient to communicate using one-way voice messages instead of simultaneous two-way voice communication. One example is the common situation where the voice message is not urgent and the sender deems it inappropriate to disturb the intended recipient. Another example is when the sender does not want to talk to the recipient because the sender is in a hurry. The present invention provides a low cost and efficient method for allowing voice messages to be delivered using data network.

Under the telephone system of the present invention, the telephones exchange handshake signals prior to the delivery and recording of voice messages. A message sender's telephone first sends a status request to a recipient's telephone. If the sender's telephone does not receive a reply (i.e., an acknowledgment) from the recipient's telephone within a reasonable time, the sender's telephone informs the sender. Similarly, if the recipient's telephone notifies the sender's telephone that it cannot receive voice messages (e.g., its memory is full), the sender's telephone also informs the sender. Thus, the sender will not waste time to record the voice message. From the sender's standpoint, this is similar to encountering a busy signal in a regular telephone. Consequently, the sender can easily learn how to use this new system.

In one embodiment of the present invention, the data network provides different levels of quality of services (QOS). The voice message can be sent using a low QOS level that permits long delays between voice-based data packets. On the other hand, the handshaking negotiation (e.g., the status request and acknowledgment packets) is carried out using a higher QOS level that permits shorter delays (e.g., less than one second).

In another embodiment of the present invention, the sender's telephone needs to deliver an access code to the recipient's telephone. Otherwise, a request to deliver voice messages will be denied. This feature could prevent the recording of "junk" mails. In one implementation of the access code, it comprises an encryption of (a) a base code of the recipient's telephone and (b) the telephone number of the sender's telephone.

These and other features and advantages of the present invention are described by the following detailed description of the embodiments together with the accompanying drawings.

DETAILED DESCRIPTION OF THE INVENTION

The present invention comprises a novel system and related methods for telephony messaging using a data network. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
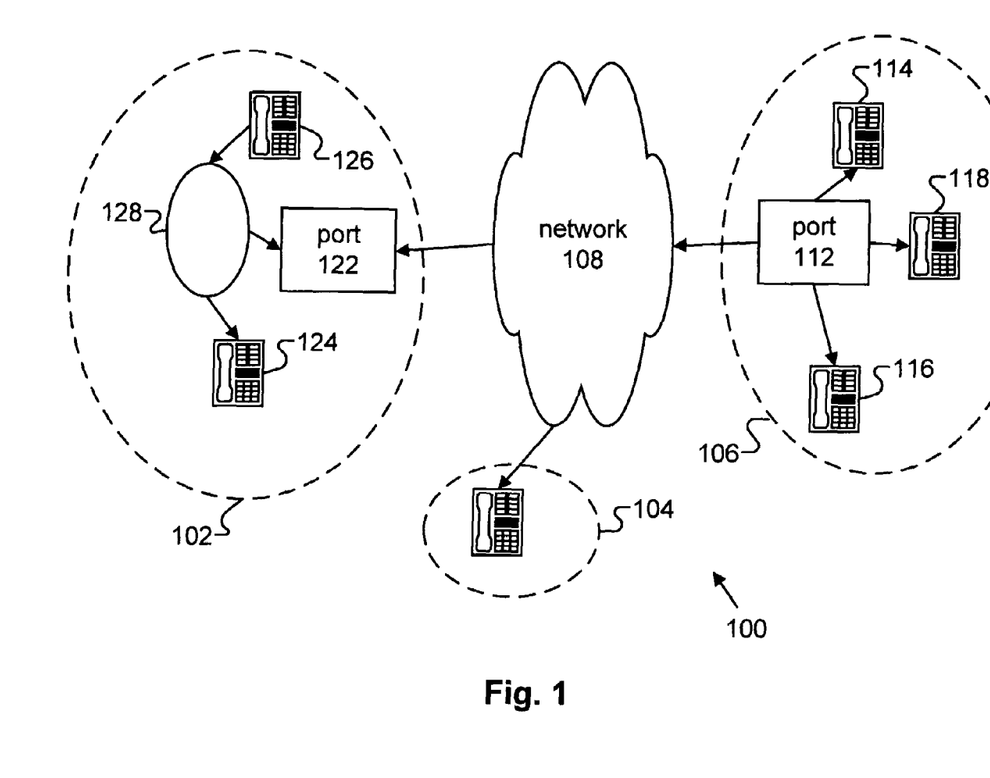
FIG. 1 is a schematic diagram showing a telephone system of the present invention.

FIG. 1 shows a data network based telephone system 100 of the present invention. It contains a plurality of clusters (such as clusters 102, 104 and 106) connected to each other through a data network 108. Each cluster contains a collection of one or more telephones. It should be understood that the term "telephone" in the description of the present inventive embodiments refers to a telephone of the present invention (described in more details below in connection with FIG. 2) instead of a conventional telephone (unless explicitly stated otherwise). If a cluster contains more than one telephone, the telephones may be connected to a voice communication port. This port may perform a very simple function of managing the bandwidth of the telephones in a cluster. For example, the port can use a single channel to serve the needs of several telephones. The port may take on more functions, such as managing the operation of the telephones in the cluster. For example, the port may temporarily store messages for the telephones so that the telephones can be built less expensively. In FIG. 1, telephones 114, 116 and 118 of cluster 106 are connected directly to a port 112, which is connected to network 108. In cluster 102, telephones 124 and 126 and a port 122 are connected to a local area network 128. Port 122 is also connected to data network 108. FIG. 1 also shows a cluster 104 having a single telephone connected directly to network 108.

One useful function of the telephone of the present invention (e.g., telephone 114) is to provide the ability to conduct simultaneous two-way voice communication with a remote telephone in a similar manner as a conventional telephone. Further, telephone 114 is able to provide an inventive voice message recording and dispatching operations: A user can use telephone 114 to deliver a message intended for recording in a remote telephone (e.g., telephone 124 in a different cluster or telephone 118 in the same cluster) rather than for initiating a two-way communication.

Figure 2:
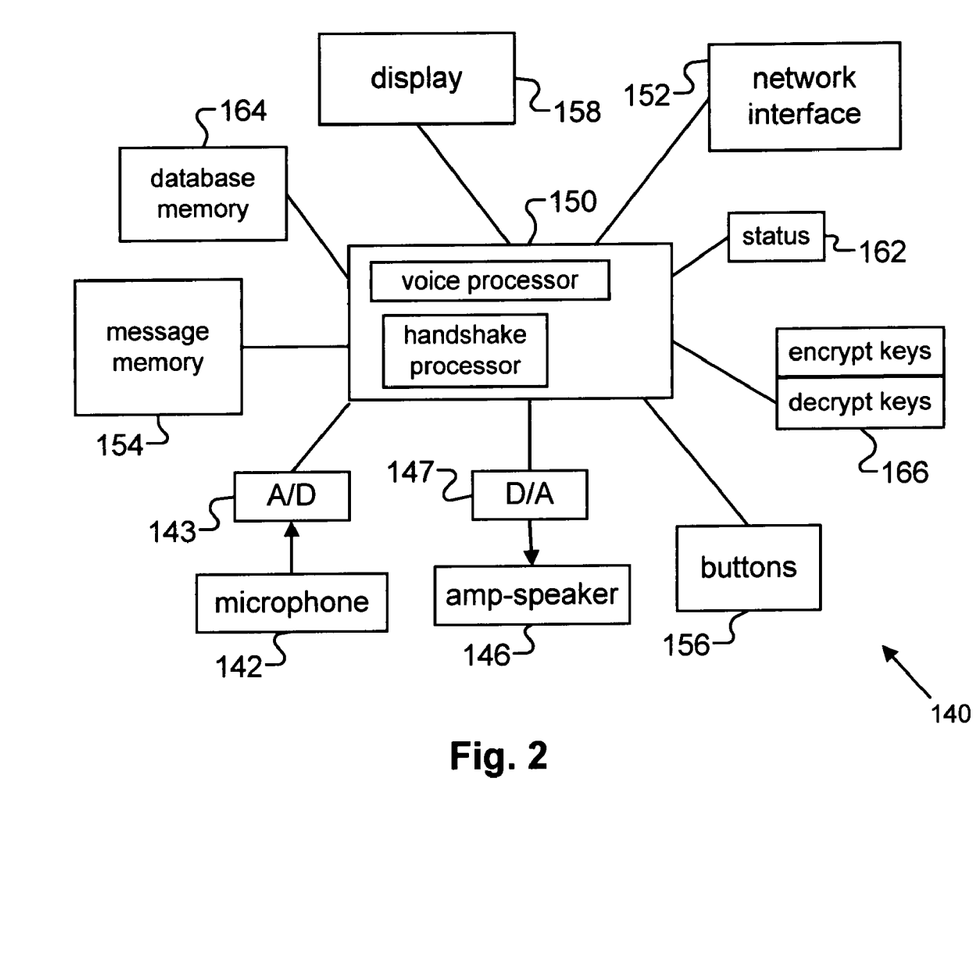
FIG. 2 is a block diagram of a telephone of the present invention.

FIG. 2 shows an embodiment of a telephone 140 of the present invention (which could be any one of the telephones in FIG. 1, such as telephone 114). It contains a microphone 142, an A/D (analog to digital) converter 143, an amplifier-speaker 146, and a D/A (digital to analog) converter 147. Microphone 142 and amplifier-speaker 146 serve similar functions as that used in a conventional telephone. A/D converter 143 converts analog audio signals generated by microphone 142 into digitized voice data. D/A converter 147 converts digitized voice data (received from another telephone) into analog audio signals.

Digitized voice data generated by A/D converter 143 is processed by a voice processor in a processor system 150. Processor system 150 preferably contains memory (random access and read-only), one or more digital signal processors, and input/output circuits. The voice processor in processor system 150 performs audio compression and decompression (codec). The processed audio data is delivered to a network interface 152 for communicating with voice communication port 112 of FIG. 1. Network 108 delivers the data to the destination port (e.g., port 122). Port 122 delivers the data to the destination telephone (e.g., telephone 124) in the same cluster. In the case where a telephone (e.g., telephone 104) is the only telephone in a cluster, network interface 152 may communicate directly with network 108.

The audio data traveling in a data network need to conform to the requirements of the network. In many networks, data (audio and regular) is encapsulated by packets or cells. The size of each packet or cell may be fixed or variable.

A user may elect to use telephone 140 to initiate two-way communication or record a voice message on a remote telephone (e.g., telephone 124). The two-way communication is carried out using conventional voice-over-data-network methods. The message dispatching and recording operation of the present invention will be described in detail below.

Turning now to the receiving operation of telephone 140, digitized voice data originated by the remote telephone (e.g., telephone 124) is received by network interface 152. The received data is decompressed by the voice processor of processor system 150. If it is determined that the voice data is intended for recording, processor system 150 stores the digitized voice data into a message memory 154. It notifies the user about the voice message using non-intrusive means (e.g., turning on a LED light). The user may retrieve the stored voice message at his/her convenience. If the audio data is intended for simultaneous two-way communication, processor system 150 alerts the user immediately (e.g., by generating a loud audio signal). When the user answers the phone, processor system 150 decompresses the digital voice data and delivers the decompressed data to D/A converter 147.

Telephone 140 contains a plurality of buttons 156. These buttons include numerical keys for dialing telephone numbers (or alphanumeric keys for entering Internet addresses, depending on the implementation of the system). Other buttons are included for controlling the operation of telephone 140 (e.g., a button may be used to indicate whether a message is intended for remote recording only). Telephone 140 may also contain a display 158 for providing visual information to users. For example, it may be used to indicate how many messages have been recorded and the telephone number of callers.

Telephone 140 contains a status register 162 for storing current status information of telephone 140. It also contains a database memory 164 for storing contact information of frequently called persons (e.g., telephone numbers, names, etc.). As explained below, it may be advisable to encrypt digital voice and other data. Thus, telephone 140 contains a key memory 166 for storing encryption and decryption keys.

In one embodiment of the present invention, the sender of a voice message first records the voice message in his/her own telephone. The voice message is then sent to the recipient's telephone when a button is pressed. One advantage is that the sender can change, edit, or delete the voice message before sending. However, a problem of this procedure is that the sender does not know whether the recipient's telephone is available to receive the voice message. In the event that the recipient's telephone is not available (e.g., the message memory is full, or the telephone is not connected to the network), the sender's voice message cannot be delivered. As a result, the sender may feel frustrated because all the efforts in editing and recording are wasted. If the frustration level becomes too high, the sender may decide not to use the system again. Consequently, it is desirable to find out the status of the recipient's telephone before the sender records any voice message.

Processor system 150 also contains a handshake processor. This processor handles handshaking operations between two telephones. One of the functions of handshaking is to allow the telephones to exchange information about message recording. Note that both audio processor and handshake processor can physically be the same processor that executes different sets of computer codes (e.g., executing codec code during voice processing and handshaking codes during handshaking operation).

Figure 3:
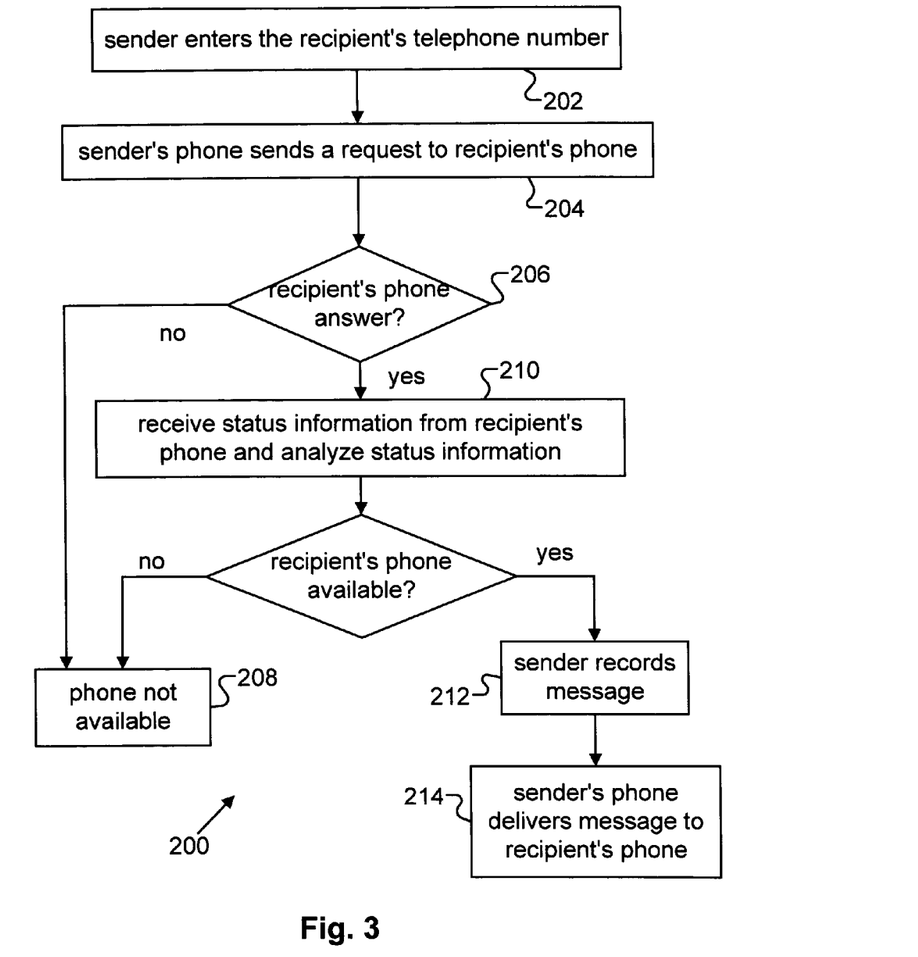
FIG. 3 is a flow chart of the operation of a sending telephone of the present invention.
Figure 4:
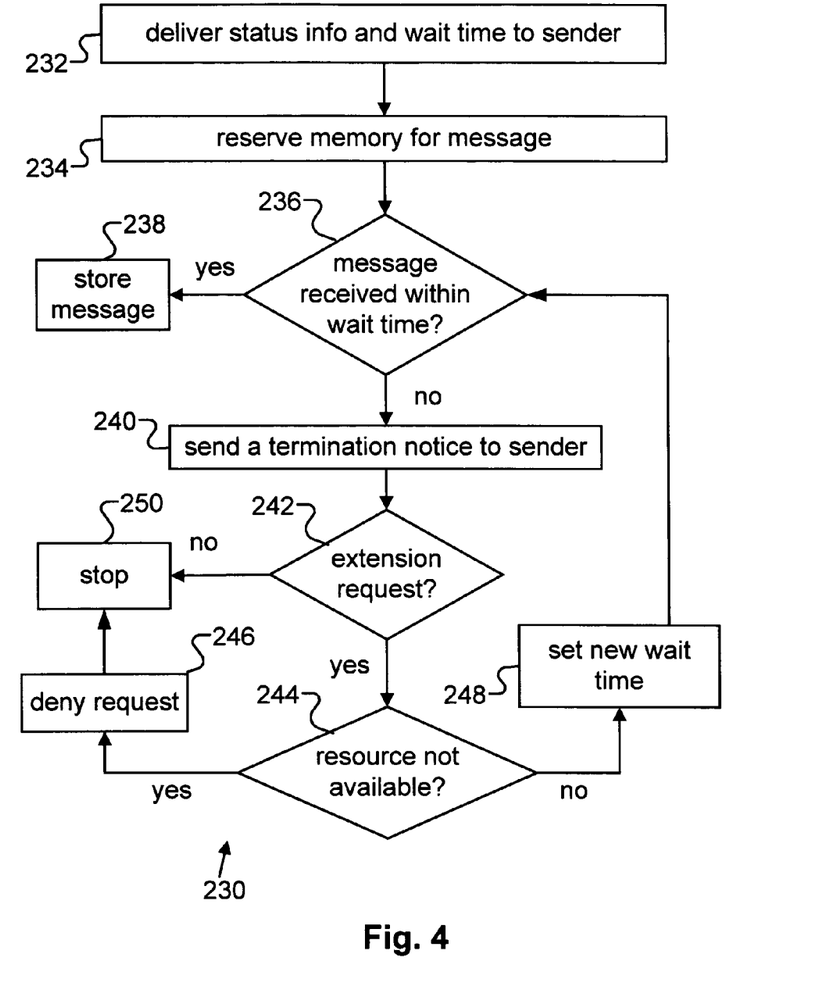
FIG. 4 is a flow chart of the operation of a recipient telephone of the present invention.

FIGS. 3 and 4 show a method to solve this problem. FIG. 3 contains a flow chart 200 that focuses on the action of the sender's telephone. Before the sender records a voice mail message, the sender enters the telephone number of the recipient (step 202). The sender's telephone sends a status request to the recipient's telephone via network 108 (step 204). The sender's telephone then waits for a reply (step 206). If the recipient's telephone does not respond to this request within a reasonable time, the sender's telephone can inform the sender that the recipient's telephone is not available (step 208). In this case, the sender will not spend time to record a message. The sender will not be frustrated because this is similar to the common situation when the other telephone is busy.

In the situation that the recipient's telephone receives the status request, it delivers a reply (i.e., acknowledgment) to the sender's telephone via network 108. The acknowledgment preferably contains the status of the recipient's telephone (obtained from a status register, such as register 162). The sender's telephone analyzes the status information (step 210). The acknowledgment may inform the sender's telephone that the receiver's telephone is not fully functional (e.g., low message storage memory, recipient wishes to block all messages, etc.). In this case, the sender's telephone also informs the sender that the recipient's telephone is not available. In this case, the sender will not record any voice message. The sender's telephone asks the sender to record a voice message only when the recipient's telephone gives a positive acknowledgment (step 212). The recorded voice message is delivered to the recipient's phone (step 214). The recipient's telephone can also inform the sender's telephone about restrictions on the voice message (e.g., the maximum duration of the message). The sender's telephone can show the restriction on its display so that the sender can adjust his/her voice message accordingly.

FIG. 4 contains a flow chart 230 that focuses on the action of the recipient's telephone. After receiving a status request from the sender's telephone, recipient's telephone delivers an acknowledgment (with status information) to the sender's telephone (step 232). It also places a limit on the time allocated to wait for the voice message from the sender's telephone. At the same time, the recipient's telephone reserves memory space for the expected message (step 234). The status information may contain limitation on the length of the message based on the memory space reserved. If the voice message is received within the wait time (step 236), the voice message is stored in the message memory (step 238). If no voice message is received within the wait time, the recipient's telephone may optionally send a termination notice to the sender's telephone (step 240). The notice may contain a grace period for the sender's telephone to respond. If the recipient's telephone does not receive a response from the sender's telephone within the grace period, the process terminates and the recipient's telephone releases the reserved memory space (step 250). If the sender's telephone request an extension (step 242), the recipient's telephone examines whether its resource is still available (step 244). For example, if another person sends a status request during the wait period, the recipient's telephone may want to allocate resource to this new caller. If resource is not available, the recipient's telephone will deny the extension request (step 246), and the process terminates. The recipient's telephone can release the reserved memory space. If resource is available, the recipient's telephone sets a new wait time and sends it to the sender's telephone (step 248).

As pointed out above, it is possible for a voice communication port to manage the operation of telephones. In this case, all or some of the above-mentioned steps are carried out by the port.

The system of the present invention may be implemented using regular data network with no QOS enhancement. In another embodiment of the present invention, the present invention can be implemented using a network that has such enhancement. The voice messages of the present invention can be delivered without any need for immediate interaction between the sender and recipient. Thus, the delay in delivery the voice messages could be more than a few minutes, and in some cases more than half an hour. As a result, the voice messages may be delivered using a low QOS level allowing long delays. On the other hand, the handshaking negotiations between the sender's telephone and recipient's telephone (e.g., status request, acknowledgment, extension request, etc.) are preferably delivered using a QOS level allowing low delays, preferably less than a second. This is because the sender would like to know the status of the recipient's telephone as soon as possible.

The QOS requirements of the present invention are different from that of regular voice-over-data-network requirements for two-way voice communication. In the case of two-way communication, the voice packets must be delivered in less than 100 milliseconds to avoid undesirable effects (e.g., echo and voice breakup). Thus, the present invention offers complementary requirement in delivery of voice packets (i.e., low priority for voice packets of the present invention versus high priority for voice packets of two-way voice communication). As a result, the load on the data network can be balanced more efficiently.

In many situations, a user may want to immediately respond to the person who left a voice message. In an embodiment of the present invention, the sending telephone includes its telephone number in the handshake negotiation and/or voice message. This telephone number can be stored in the recipient's telephone. The recipient can press a button, and the recipient's telephone will start handshake negotiation with, and later deliver a reply voice message to, the sender's telephone.

In another embodiment of the present invention, the privacy of the telephone users is protected. Based on current cost structure, it will cost very little to deliver voice messages over a data network using low QOS level. Consequently, there is a risk that mass advertisers may dispatch a large number of voice messages to many telephones. When this happens, it may create a backlash against this type of telephones. One method to reduce this risk is to give users an option to program a telephone (e.g., telephone 140) to accept voice messages only if the messages (or handshake negotiations) contain an authorized access code. This code is given only to friends, relatives and business associates of the owner of telephone 140. It is also important that this access code cannot be further distributed so that the owner can maintain full control over the access code.

In the present invention, one component of the access code is made up of a confidential base code of one telephone. This is an alphanumeric value selected by the owner of telephone 140. It is entered by the owner into telephone 140 using buttons 156, and is stored in the telephone (e.g., database memory 164). Another component of the access code is an alphanumeric value that can be used to identify a second telephone. An example of this value is the telephone number (or Internet address).

Figure 5:
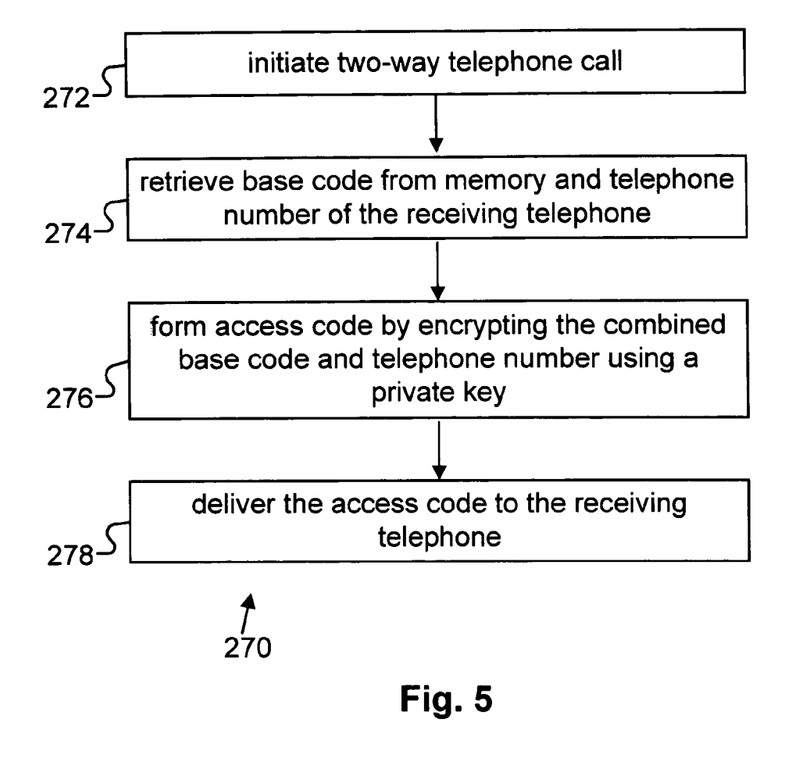
FIG. 5 is a flow chart showing the steps for generating an access code of the present invention.

FIG. 5 shows a flow chart 270 for an originating telephone to send an access code to a receiving telephone. In a preferred arrangement, both the originator and receiver are engaging in a two-way telephone communication and agree to send the access code (step 272). The originating telephone retrieves the base code from its database memory 164 and obtains the telephone number of the receiving telephone (step 274). This telephone number may be obtained by the originating telephone as part of the handshaking to establish the two-way communication, or delivered to the originating telephone solely for generating the access code. The originating telephone also retrieves a private encryption key from its key memory 166. The private encryption key is known only to the originating telephone. This key is used to encrypt the combined base code of the originating telephone and the telephone number of the receiving telephone (step 276). The result is the access code. The originating telephone then delivers the access code to the receiving telephone (step 278). The receiving telephone can store this access code in its database memory.

The reverse procedure is used when the receiving telephone sends a request to the originating telephone to request permission to send a voice message. The access code is retrieved from its database memory and embedded in the status request. The telephone number of the receiving telephone is also embedded in the status request. Upon receiving the access code, the originating telephone decrypts the access code using a private decrypting key stored in its key memory 166. It compares the decrypted base code with the base code stored in its database memory 164. It also compares the decrypted telephone number with the telephone number embedded in the status request. If the results of the comparisons are positive, the originating telephone accepts the request. Otherwise, the originating telephone denies the request.

One advantage of the method of the present invention is that the access code is different for different telephones. Thus, even if the receiving telephone distributes this access code to other telephones, they cannot use it to establish handshaking. Because the access code is encrypted, it will be very difficult for others to know the base code.

Another problem with delivering voice messages over data network is that many people do not trust routing private voice messages through routers and servers in the data network. This is because other people may be able to listen to the voice messages during their journey from one telephone to another. One way to solve this problem is for the sender to use public key encryption to encrypt voice messages. Public key is preferably used because the key would be given to a large number of friends, relatives and business associates. An easy way to give the public key to a person who wishes to send messages is for the sender and recipient to first establish a two-way telephone communication. The person who wishes to give out the key can press a button on the telephone, and the telephone will pass the public key to the database memory of the other telephone. The telephone may also send other identification information (e.g., name and phone number) for storage in the database memory. The sender's telephone can then automatically encrypt voice messages directed to the recipient.

In a different embodiment of the present invention, the voice messages are stored in the voice communication port instead of the telephone. When the port (e.g., port 122) receives a voice message intended for a recipient (e.g., telephone 124), it sends a signal to notify telephone 124 that a voice message is received. The owner of telephone 124 may retrieve the voice message immediately or at a later time. An advantage of this arrangement is that a port has more memory to more efficiently store and archive messages.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. A method for a first device to send a digitized voice message to a second device through a data network, said data network having a first quality of service and a second quality of service, said first quality of service having a delay less than said second quality of service, said method comprising:
    sending by said first device through said data network using said first quality of service a request for status data of said second device;
    receiving by said first device through said data network said status data of said second device;
    analyzing by said first device said status data to determine whether said second device is available for storing said digitized voice message; and
    after said analyzing, sending by said first device said digitized voice message to said second device using said second quality of service if said second device is available for storing.

2. The method of claim 1 further comprising notifying a user by said first device of a status of said second device.

3. The method of claim 1 wherein said status data includes information on restriction on recording.

4. The method of claim 3 wherein said information on restriction includes restriction on maximum duration of recording.

5. The method of claim 1 wherein said status data includes a time limit allocated by said second device to wait for said voice message from said first device.

6. The method of claim 5 further comprising sending by said second device a termination notice to said first device if said voice message is not received within said time limit.

7. The method of claim 1 further comprising sending by one of said first and said second devices an access code to another of said first and said second devices.

8. The method of claim 7 wherein said access code includes information of said first and said second devices.

9. The method of claim 1 wherein said voice message is encrypted.

10. A sending device for sending a digitized voice message of a user to a recording device through a data network, said data network having a first quality of service and a second quality of service, said first quality of service having a delay less than said second quality of service, said sending device comprising:
   a network interface that can send a request for status data to said recording device using said first quality of service and receive said status data from said recording device;
   a processor for analyzing said status data to determine whether said recording device is available for recording said digitized voice message; and
   said network interface sends said digitized voice message to said recording device using said second quality of service after said processor determines that said recording device is available for recording said voice message.

11. The sending device of claim 10 further comprising an output for notifying said user about a status of said recording device.

12. The sending device of claim 10 wherein said status data includes information on restriction on recording.

13. The sending device of claim 12 wherein said information on restriction includes restriction on maximum duration of recording.

14. The sending device of claim 10 wherein said status data includes a time limit allocated by said recording device to wait for said voice message from said sending device.

15. The sending device of claim 10 wherein said network interface also sends an access code to said recording device.

16. The sending device of claim 15 wherein said access code includes information of said sending and said recording devices.

17. The sending device of claim 10 wherein said voice message is encrypted.

* * * * *